United States Patent
Silvera et al.

(10) Patent No.: US 9,218,186 B2
(45) Date of Patent: Dec. 22, 2015

(54) SOFTWARE COMPILER GENERATED THREADED ENVIRONMENT

(75) Inventors: Raul E. Silvera, Woodbridge (CA); Guansong Zhang, Markham (CA); Yue Zhao, Aurora (CA)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 13/223,486

(22) Filed: Sep. 1, 2011

(65) Prior Publication Data
US 2013/0061000 A1    Mar. 7, 2013

(51) Int. Cl.
*G06F 9/30*   (2006.01)
*G06F 9/38*   (2006.01)
*G06F 9/45*   (2006.01)

(52) U.S. Cl.
CPC .............. *G06F 9/3851* (2013.01); *G06F 8/45* (2013.01); *G06F 9/3009* (2013.01); *G06F 9/3814* (2013.01)

(58) Field of Classification Search
CPC ....... G06F 9/3009; G06F 9/3851; G06F 8/45; G06F 9/3814
USPC ........................................................ 717/151
See application file for complete search history.

(56) References Cited

U.S. PATENT DOCUMENTS

| | | | |
|---|---|---|---|
| 6,539,339 B1 | 3/2003 | Berry et al. | |
| 7,234,139 B1* | 6/2007 | Feinberg | 718/1 |
| 7,490,218 B2 | 2/2009 | Eggers et al. | |
| 7,882,498 B2 | 2/2011 | Ottoni et al. | |
| 2006/0117316 A1* | 6/2006 | Cismas et al. | 718/103 |
| 2006/0230409 A1* | 10/2006 | Frigo et al. | 718/108 |
| 2007/0074213 A1* | 3/2007 | Ma et al. | 718/100 |
| 2008/0005438 A1* | 1/2008 | Xing et al. | 710/241 |
| 2010/0125722 A1* | 5/2010 | Hickey et al. | 712/228 |
| 2010/0281471 A1 | 11/2010 | Liao et al. | |
| 2011/0099357 A1* | 4/2011 | Loen | 712/225 |
| 2011/0225589 A1* | 9/2011 | Pirog et al. | 718/102 |

OTHER PUBLICATIONS

Culler et al., "TAM—A COmpiler controlled Threaded Abstract Machine", Journal of Parallel and Distributed Computing, vol. 18, pp. 347-370; Jul. 1993.*

* cited by examiner

*Primary Examiner* — Wei Zhen
*Assistant Examiner* — Mohammed Huda
(74) *Attorney, Agent, or Firm* — Cantor Colburn LLP; Parashos Kalaitzis

(57) ABSTRACT

A computer-implemented method for creating a threaded package of computer executable instructions from software compiler generated code includes allocating, through a computer processor, the computer executable instructions into a plurality of stacks, differentiating between different types of computer executable instructions for each computer executable instruction allocated to each stack of the plurality of stacks, creating switch points for each stack of the plurality of stacks based upon the differentiating, and inserting the switch points within each stack of the plurality of stacks.

13 Claims, 4 Drawing Sheets

US 9,218,186 B2

SOFTWARE COMPILER GENERATED THREADED ENVIRONMENT

BACKGROUND

The present invention relates to computer executable code, and more specifically, to the generation of a threaded processing environment through intelligent compiler code.

SUMMARY

According to one embodiment of the present invention, a computer-implemented method for creating a threaded package of computer executable instructions from software compiler generated code includes allocating, through a computer processor, the computer executable instructions into a plurality of stacks, differentiating between different types of computer executable instructions for each computer executable instruction allocated to each stack of the plurality of stacks, creating switch points for each stack of the plurality of stacks based upon the differentiating, inserting the switch points within each stack of the plurality of stacks.

According to another embodiment of the present invention, a computer program product includes a non-transitory computer readable storage medium having computer executable instructions stored thereon, that, when executed by a computer processor, direct the computer processor to perform a method for creating a threaded package of computer executable instructions from software compiler generated code. The method includes allocating the computer executable instructions into a plurality of stacks, differentiating between different types of computer executable instructions for each computer executable instruction allocated to each stack of the plurality of stacks, creating switch points for each stack of the plurality of stacks based upon the differentiating, inserting the switch points within each stack of the plurality of stacks.

According to yet another embodiment of the present invention, a software compiler system includes a memory configured to store computer executable instructions and a computer processor operatively coupled to the memory. The computer processor is configured to perform a method for creating a threaded package of computer executable instructions from software compiler generated code. The method includes allocating, through the computer processor, the computer executable instructions into a plurality of stacks, differentiating between different types of computer executable instructions for each computer executable instruction allocated to each stack of the plurality of stacks, creating switch points for each stack of the plurality of stacks based upon the differentiating, and inserting the switch points within each stack of the plurality of stacks.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Example embodiments of the present invention are directed to the generation of a threaded processing environment through intelligent compiler code. Generally, computer processors have sufficient numerical processing speed to calculate upon a plurality of information in a short period of time. However, there may be performance bottlenecks associated with overall processing time stemming from the slow speed and latency of memory operations.

Figure 1:
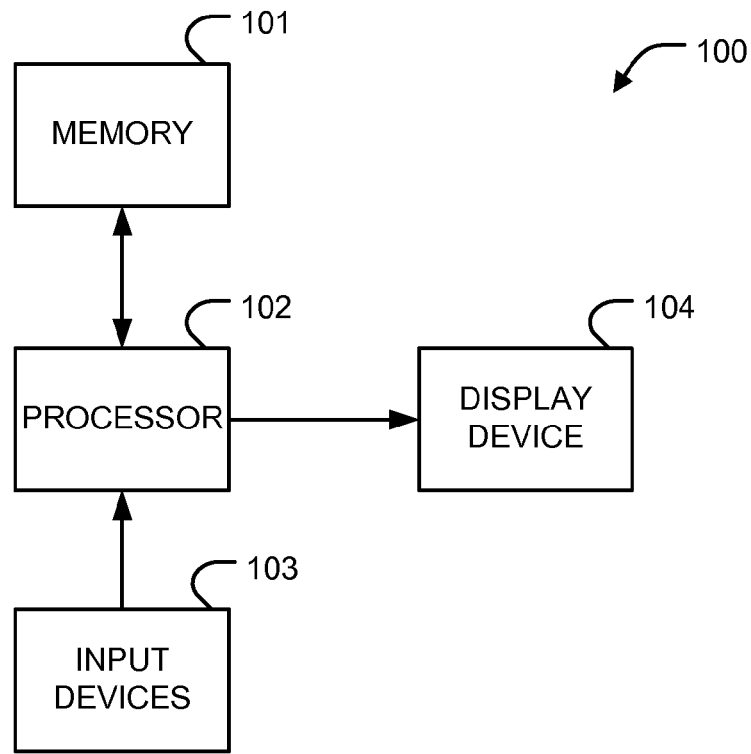
FIG. 1 is a diagram of a computer apparatus.

For example, FIG. 1 is a diagram of a computer apparatus. The computer apparatus 100 includes memory 101 operatively coupled to processor 102. The processor 102 may be any suitable computer processor. The computer apparatus 100 further includes display device 104 and input devices 103 operatively coupled to the processor 102.

The memory 101 may contain program instructions and other information for processing by the processor 102. During processing, portions of the information stored in the memory 101 must be loaded onto a localized cache or registers of the processor 102. The information available at the localized cache or registers may be operated upon fairly quickly even for numerically intensive tasks. However, the refresh or transfer of the information to the localized cache or registers introduces latencies which require the processor 102 to wait, thus effectively losing computing cycles and increasing the overall time for a program to complete.

In order to reduce the impact of memory operations, example embodiments provide a solution which effectively provides an illusion of a threaded processing environment even in systems lacking any multi-threaded instructions. The technical benefits of this solution include a decrease in overhead associated with memory operations and a decrease in total processing time as compared to conventional sequential non-threaded processing.

Figure 2:
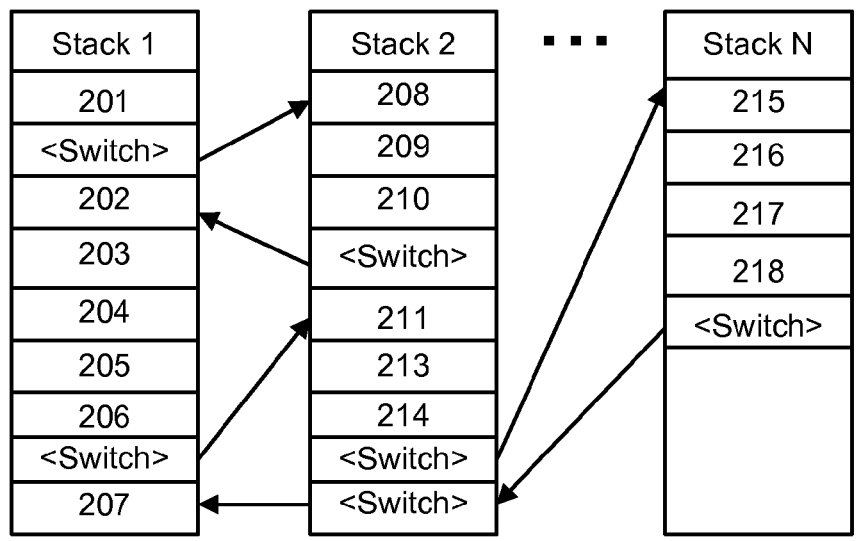
FIG. 2 is a diagram of a threaded environment, according to an example embodiment.

FIG. 2 is a diagram of a threaded environment, according to an example embodiment. As illustrated, the environment includes a plurality of stacks 1, 2, . . . , N each assigned a plurality of instructions 201-218 and switch points labeled <Switch>. According to example embodiments, each switch point is a program instruction which directs processing to cease at the stack and continue at an associated stack. The program instruction may simply include passing a program counter and other suitable information to a computer processor such that the next instruction fetched for processing resides on a different stack. This is illustrated more clearly in FIG. 3.

Figure 3:
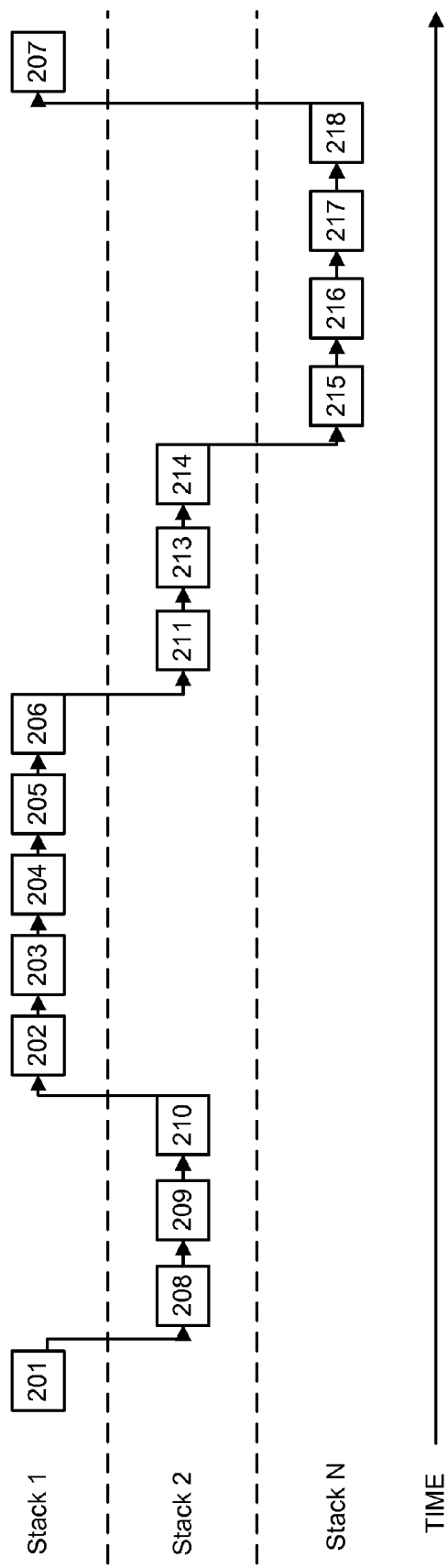
FIG. 3 is a timing diagram of the instructions depicted in FIG. 2, according to an example embodiment.

FIG. 3 is a timing diagram of the instructions depicted in FIG. 2, according to an example embodiment. As shown in FIG. 3, instruction processing initialized at Stack 1, instruction 201. Upon execution of instruction 1, processing is switched to Stack 2, instruction 208. Instruction processing continues sequentially at instructions 209 and 210. Upon execution of instruction 210, processing is switched to Stack 1, instruction 202. Instruction processing continues sequentially at instructions 203, 204, 205, and 206. Upon execution of instruction 206, processing is switched to Stack 2, instruction 211. Instruction processing continues sequentially at instructions 213 and 214. Upon execution of instruction 214, processing is switched to Stack 3, instruction 215. Instruction processing continues sequentially at instructions 216, 217, and 218. Upon execution of instruction 218, processing is switched to Stack 1, instruction 207.

It should be understood that as processing is switched from one stack to another, any latency introduced from transfer of information from memory to a localized cache is reduced when considered globally. For example, during processing of the timing diagram of FIG. 3, if there is additional information required by instructions 202-206 of Stack 1 after completion of instruction 201, the switch to Stack 2 allows the memory transfer to continue while also allowing processing to continue. Thus, the necessary memory transfer is completed prior to switch back after execution of instruction 210, and therefore, all necessary information is available to instruction 202. The same or somewhat similar scenarios are apparent for instructions 206-207 and 210-211, where a memory operation is necessary therebetween, and thus a switch point is inserted to allow processing of other instructions while memory operations are completed.

The particular switch points illustrated in FIGS. 2 and 3 are illustrative and provided only for the purposes of explanation of processing of an example threaded processing package. Hereinafter, a detailed description of the creation of a threaded environment is provided with reference to FIG. 4.

Figure 4:
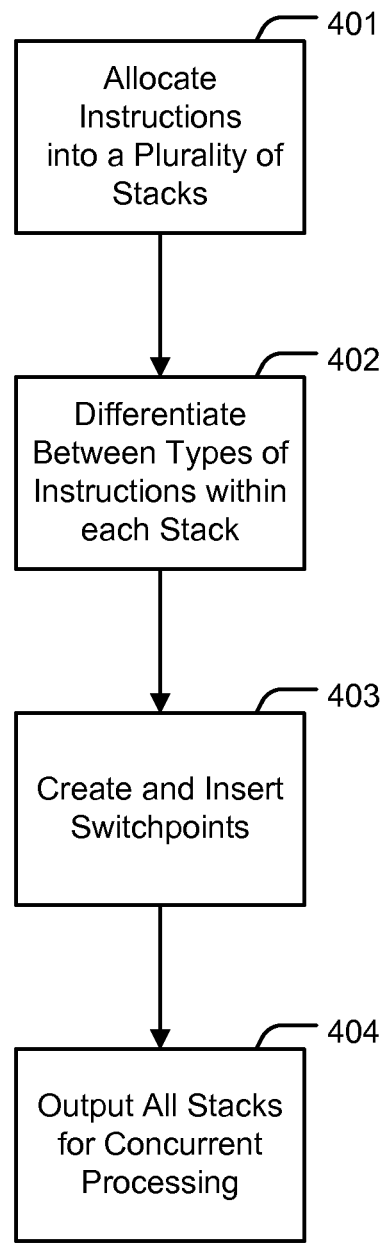
FIG. 4 is a flowchart of a method for creating a threaded environment in compiler generated code, according to an example embodiment.

FIG. 4 is a flowchart of a method for creating a threaded processing package environment in software compiler generated code, according to an example embodiment. As used herein, the terms compiler and software compiler refer to a computer program, process, or set of processes that are configured to transform computer executable code written in a first computer programming language (e.g., a source language) into a different computer language (e.g., a target language executable by a computer).

As illustrated, the method 400 includes allocating items into a plurality of stacks at block 401. The allocating includes interpreting a function to be compiled through a software compiler, dividing the function into one or more sets of computer executable instructions, and allocating the divided sets to associated stacks. The associated stacks may be considered work groups, or groups of instructions. The total size of each workgroup may be determined based upon a local buffer size available to a target processor for which the stacks are being compiled/created.

The method 400 further includes differentiating between types of instructions for every instruction of each of the stacks at block 402. According to one example embodiment, there are at least two types of instructions, memory operations and computation operations. Memory operations are types of instructions which require access to information stored in remote memory or memory not localized with respect to a computer processor. For example, the memory 101 of FIG. 1 is remote memory as compared to localized cache available to the processor 102. The differentiating includes interpreting each instruction at the software compiler to determine whether or not there is a predetermined amount of latency introduced through processing of the instruction or if there is memory access involved in the instruction.

Thereafter, the method 400 includes creating and inserting switch points within each stack at block 403 based on the differentiating. For example, upon differentiating all memory operations for each stack, switch points are created to switch processing from one stack to another available stack in response to a memory operation. Thus, during processing, the impact of latency introduced through these memory operations is reduced due to the continual switching to different stacks which do not require memory operations at that point in processing.

Thereafter, the method 400 includes outputting all stacks for concurrent processing at block 404. For example, as the steps 401-403 are provided by a software compiler creating the threaded package environment, the completed computer executable code stacks which include the new switch points may be finalized and provisioned at block 404 for execution by a target processor for which the stacks have been compiled/created.

As described above, example embodiments provide a threaded processing environment, or the illusion of the same, for target processors which do not support software threads. Further, some computing environments do not have operating system (OS) based threading (e.g., embedded systems), however example embodiments provide stacks of sequential computer executable instructions which overcome these deficiencies through the aforementioned switch points.

As further described above, example embodiments provide compiler generated "threads" based upon switch points, which require less context switch as compared to conventional, OS based threads.

Moreover, example embodiments provide increased efficiency as compared to OS based threads due to prior knowledge of exactly where a switch point is (i.e., switches are compiler-generated before actual processing). In contrast, conventional threads switch based on an equal time slice which may occur in the middle of program instruction execution.

It is further noted that embodiments of the invention may be embodied in the form of computer-implemented software compiler processes and apparatuses for practicing those software compiler processes. Therefore, according to an exemplary embodiment, the methodologies described hereinbefore may be implemented by a computer system or apparatus, for example, as illustrated in FIG. 1. Therefore, portions or the entirety of the methodologies described herein may be executed as instructions in the processor 102 of the computer system 100. The computer system 100 includes the memory 101 for storage of instructions and information, input device(s) 103 for computer communication, and display device 104. Thus, the present invention may be implemented, in software, for example, as any suitable computer program on a computer system somewhat similar to computer system 100. For example, a program in accordance with the present invention may be a computer program product causing a computer to execute the example software compiling methods described herein.

Figure 5:
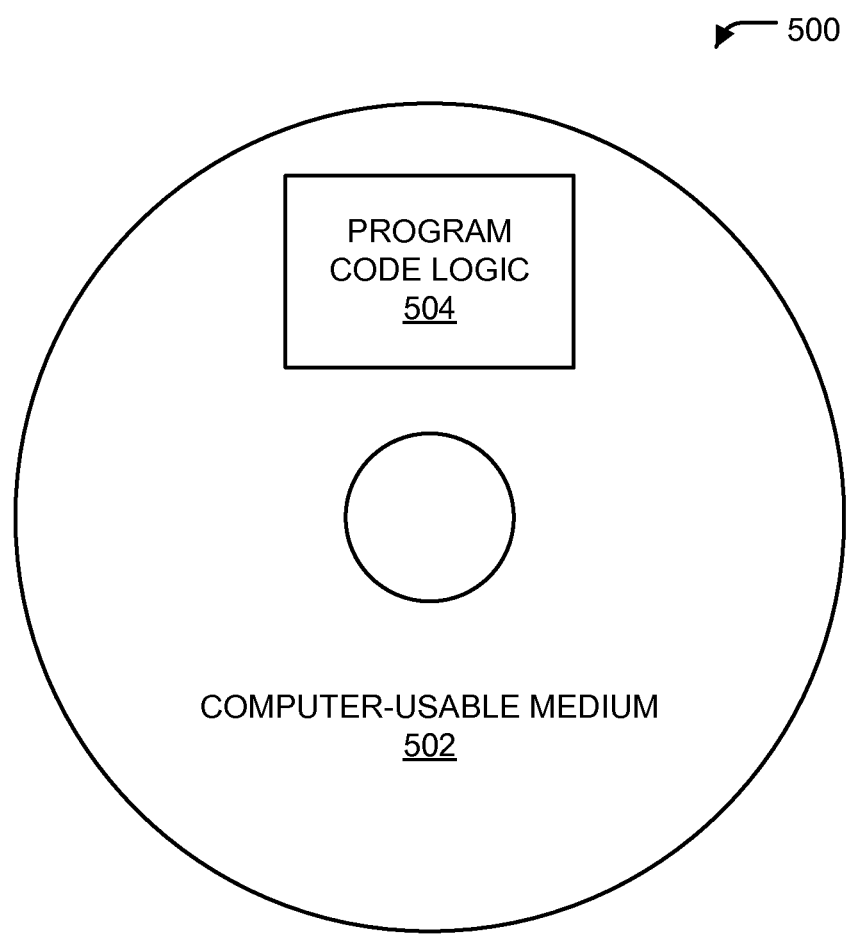
FIG. 5 illustrates a computer program product.

Therefore, embodiments can be embodied in the form of computer-implemented processes and apparatuses for practicing those processes on a computer program product. Embodiments include the computer program product 500 as depicted in FIG. 5 on a computer usable medium 502 with computer program code logic 504 containing instructions embodied in tangible media as an article of manufacture. Exemplary articles of manufacture for computer usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the invention. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the invention. When implemented on a general-purpose microprocessor, the computer program code logic 504 segments configure the microprocessor to create specific logic circuits which recreate the functionality and acts described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for creating a threaded package of computer executable instructions from software compiler generated code, comprising:
    allocating, through a computer processor, the computer executable instructions into a plurality of stacks;
    differentiating between different types of computer executable instructions for each computer executable instruction allocated to each stack of the plurality of stacks, wherein the differentiating comprises interpreting each computer executable instruction at a software compiler to differentiate between at least two different types of computer executable instructions, the at least two different types of computer executable instructions comprising a memory operation and a computation operation, wherein the memory operation comprises a transfer of information from a remote memory to a localized cache of a target processor, and wherein the computation operation is a computer executable instruction involving computation on information within the localized cache of the target processor;
    creating, by the software compiler, switch points for each stack of the plurality of stacks based upon the differentiating;
    inserting, by the software compiler, the created switch points directly after any computer executable instructions that were determined to be associated with a memory access by the differentiating within each stack of the plurality of stacks; and
    executing the plurality of stacks of computer executable instructions after inserting the switch points, wherein the execution comprises:
        based on execution of a first computer executable instruction in a first stack of the plurality of stacks, initiating a transfer of information from the remote memory to the localized cache or register of the target processor;
        switching from the first stack to a second stack of the plurality of stacks based on a first switch point that is located directly after the first computer executable instruction in the first stack;
        initiating execution of a second computer executable instruction in the second stack while processing the transfer of information from the remote memory to the localized cache associated with the first computer executable instruction in the first stack;
        switching from the second stack to the first stack based on a second switch point that is located in the second stack after the second computer executable instruction; and
        after switching from the second stack to the first stack, performing a third computer executable instruction in the first stack comprising the computation operation using the information in the localized cache that was transferred by the first computer executable instruction.

2. The method of claim 1, wherein the allocating comprises:
    interpreting a function described by the computer executable instruction to be compiled through a software compiler;
    dividing the function into one or more sets of computer executable instructions; and
    allocating the one or more sets to associated stacks.

3. The method of claim 2, wherein the associated stacks are groups of sequential computer executable instructions.

4. The method of claim 3, wherein a total size of each group of sequential computer executable instructions is based upon a local buffer size available to a target processor for which the stacks are being created.

5. The method of claim 1, further comprising:
    outputting the computer executable instructions associated with the plurality of stacks as a threaded package of computer executable instructions for a target processor.

6. A computer program product comprising a non-transitory computer readable storage medium having computer executable instructions stored thereon, that, when executed by a computer processor, direct the computer processor to perform a method for creating a threaded package of computer executable instructions from software compiler generated code, the method comprising:
    allocating the computer executable instructions into a plurality of stacks;
    differentiating between different types of computer executable instructions for each computer executable instruction allocated to each stack of the plurality of stacks, wherein the differentiating comprises interpreting each computer executable instruction at a software compiler to differentiate between at least two different types of computer executable instructions, the at least two different types of computer executable instructions comprising a memory operation and a computation operation, wherein the memory operation comprises a transfer of information from a remote memory to a localized cache of a target processor, and wherein the computation operation is a computer executable instruction involving computation on information within the localized cache of the target processor;

creating, by the software compiler, switch points for each stack of the plurality of stacks based upon the differentiating;

inserting, by the software compiler, the created switch points directly after any computer executable instructions that were determined to be associated with a memory access by the differentiating within each stack of the plurality of stacks; and executing the plurality of stacks of computer executable instructions after inserting the switch points, wherein the execution comprises:

based on execution of a first computer executable instruction in a first stack of the plurality of stacks, initiating a transfer of information from the remote memory to the localized cache or register of the target processor;

switching from the first stack to a second stack of the plurality of stacks based on a first switch point that is located directly after the first computer executable instruction in the first stack;

initiating execution of a second computer executable instruction in the second stack while processing the transfer of information from the remote memory to the localized cache associated with the first computer executable instruction in the first stack;

switching from the second stack to the first stack based on a second switch point that is located in the second stack after the second computer executable instruction; and after switching from the second stack to the first stack, performing a third computer executable instruction in the first stack comprising the computation operation using the information in the localized cache that was transferred by the first computer executable instruction.

7. The computer program product of claim 6, wherein the allocating comprises:

interpreting a function described by the computer executable instruction to be compiled through a software compiler;

dividing the function into one or more sets of computer executable instructions; and allocating the one or more sets to associated stacks.

8. The computer program product of claim 7, wherein the associated stacks are groups of sequential computer executable instructions.

9. The computer program product of claim 8, wherein a total size of each group of sequential computer executable instructions is based upon a local buffer size available to a target processor for which the stacks are being created.

10. The computer program product of claim 6, wherein the method further comprises:

outputting the plurality of stacks as a threaded package of computer executable instructions for a target processor.

11. A software compiler system, comprising:

a memory configured to store computer executable instructions; and a computer processor operatively coupled to the memory, wherein the computer processor is configured to perform a method for creating a threaded package of computer executable instructions from software compiler generated code, the method comprising:

allocating, through the computer processor, the computer executable instructions into a plurality of stacks;

differentiating between different types of computer executable instructions for each computer executable instruction allocated to each stack of the plurality of stacks, wherein the differentiating comprises interpreting each computer executable instruction at a software compiler to differentiate between at least two different types of computer executable instructions, the at least two different types of computer executable instructions comprising a memory operation and a computation operation, wherein the memory operation comprises a transfer of information from a remote memory to a localized cache of a target processor, and wherein the computation operation is a computer executable instruction involving computation on information within the localized cache of the target processor;

creating, by the software compiler, switch points for each stack of the plurality of stacks based upon the differentiating;

inserting, by the software compiler, the created switch points directly after any computer executable instructions that were determined to be associated with a memory access by the differentiating within each stack of the plurality of stacks; and executing the plurality of stacks of computer executable instructions after inserting the switch points, wherein the execution comprises:

based on execution of a first computer executable instruction in a first stack of the plurality of stacks, initiating a transfer of information from the remote memory to the localized cache or register of the target processor;

switching from the first stack to a second stack of the plurality of stacks based on a first switch point that is located directly after the first computer executable instruction in the first stack;

initiating execution of a second computer executable instruction in the second stack while processing the transfer of information from the remote memory to the localized cache associated with the first computer executable instruction in the first stack;

switching from the second stack to the first stack based on a second switch point that is located in the second stack after the second computer executable instruction; and after switching from the second stack to the first stack, performing a third computer executable instruction in the first stack comprising the computation operation using the information in the localized cache that was transferred by the first computer executable instruction.

12. The system of claim 11, further comprising:

a computer readable storage medium operatively coupled to the computer processor, the computer readable storage medium being configured to store computer executable instructions representing the method.

13. The system of claim 11, wherein the allocating comprises:
- interpreting a function described by the computer executable instruction to be compiled through a software compiler;
- dividing the function into one or more sets of computer executable instructions; and
- allocating the one or more sets to associated stacks, wherein the associated stacks are groups of sequential computer executable instructions, and wherein a total size of each group of sequential computer executable instructions is based upon a local buffer size available to a target processor for which the stacks are being created.

* * * * *